US008473932B2

(12) United States Patent
Meijer et al.

(10) Patent No.: US 8,473,932 B2
(45) Date of Patent: *Jun. 25, 2013

(54) RELAXED AND EXTENDED DELEGATES

(75) Inventors: Henricus Johannes Maria Meijer, Mercer Island, WA (US); Brian C. Beckman, Newcastle, WA (US); Peter F. Drayton, Redmond, WA (US); David N. Schach, Redmond, WA (US); Ralf Lammel, Redmond, WA (US); Avner Y. Aharoni, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

This patent is subject to a terminal disclaimer.

(21) Appl. No.: 12/715,253

(22) Filed: Mar. 1, 2010

(65) Prior Publication Data
US 2010/0162218 A1    Jun. 24, 2010

Related U.S. Application Data

(63) Continuation of application No. 11/214,701, filed on Aug. 30, 2005, now Pat. No. 7,694,285.

(51) Int. Cl.
*G06F 9/45* (2006.01)
*G06F 9/44* (2006.01)

(52) U.S. Cl.
USPC ........... 717/141; 717/114; 717/115; 717/116; 717/117; 717/118; 717/119

(58) Field of Classification Search
None
See application file for complete search history.

(56) References Cited

U.S. PATENT DOCUMENTS

| | | | |
|---|---|---|---|
| 5,579,518 A | 11/1996 | Yasumatsu | |
| 5,999,988 A | 12/1999 | Pelegri-Llopart | |
| 6,185,728 B1 | 2/2001 | Hejlsberg | |
| 6,381,734 B1 | 4/2002 | Golde | |
| 6,714,991 B1 | 3/2004 | Bak | |
| 6,941,558 B2 | 9/2005 | Hill | |
| 7,383,255 B2 | 6/2008 | Desai | |
| 7,516,459 B2 | 4/2009 | Nagendra | |
| 7,694,285 B2 * | 4/2010 | Meijer et al. | 717/141 |
| 2002/0144018 A1 | 10/2002 | Knutson | |
| 2004/0193616 A1 | 9/2004 | Pharies | |
| 2004/0194058 A1 | 9/2004 | Meijer | |
| 2004/0205750 A1 | 10/2004 | Neuenhofen | |
| 2005/0044093 A1 | 2/2005 | Patch | |
| 2005/0091670 A1 | 4/2005 | Karatal | |
| 2005/0177589 A1 | 8/2005 | Venkatesh | |
| 2006/0101425 A1 | 5/2006 | Donovan | |
| 2007/0074185 A1 | 3/2007 | Meijer | |

OTHER PUBLICATIONS

Hicks, et al., "Dynamic Software Updating", Power Point Presentation, 22 Pages, accessible at: http://sunset.usc.edu/classes/cs599_2001/Week7_1.ppt. Last Accessed Jan. 4, 2005.

(Continued)

*Primary Examiner* — Lewis A Bullock, Jr.
*Assistant Examiner* — Christine Dang
(74) *Attorney, Agent, or Firm* — Workman Nydegger

(57) ABSTRACT

Systems and methods that enhance expressibility in a programming language (e.g., Visual Basic) via relaxation of artificial restrictions and extension of delegates associated therewith, without changing the runtime infrastructure. A stub is employed that can replace an impermissible expression in the programming language, to leverage the existing permissible expressions.

21 Claims, 9 Drawing Sheets

OTHER PUBLICATIONS

"Lecture 20: COBRA", CS3101, 2004, 19 Pages, Accessible at: http://www.cs.man.ac.uk/kung-kiu/cs31001/cobra.pdf, last accessed Jan. 4, 2006, University of Manchester.

".NET Framework Developer's Guide: Delegates", 1 Page, Accessible at: http://msdn.microsoft.com/library/default.asp?url=/library/en-us/cpguide/html/cpcondelegates.asp, last accessed Jan. 4, 2005.

Graham, Paul; "On Lisp, Chapter 5; Returning Functions", Prentice Hall, 1993, pp. 61-75. Accessed From http://paulgraham.com/onlisptext.html on Mar. 12, 2009.

"The Complier", 1962 Artificial Intelligence Project—REL and MIT Computation Center Memo 39, Retrieved from ftp://publictions.ai.mit.edu/ai-publications/pdf/AIM-039.pdf on Mar. 12, 2009.

Steele, Guy L., "Common Lisp the Language", 2nd Edition, 1990, Digital Press, Chapters 1, 2, 4, 11, 20, and 25, Accessed from http://www.cs.cmu.edu/Groups/AI/html/cltl/cltl2.html on Mar. 12, 2009.

Wiseman, John, "Lisp DLLs in ACL", Mar. 7, 2002, Accessed from http://lemonodor.co,/archives/00064.html on Mar. 16, 2009.

Wei et al., "The Design of a Stub Generator for Heterogeneous RPC Systems", Mar. 1991, Journal of Parallel and Distributed Computing, vol. 11, Issue 3, pp. 188-197.

Jarvi, Jaakko, Gary Powell and Andrew Lumsdaine. "The Lambda Library: unnamed functions in C++" Software-Practice and Experience, 2003. vol. 33, pp. 259-291. Retrieved from http://portal.acm.org/citation.cfm?id=779144 on Sep. 9, 2009.

Seibel, Peter, "Practical Common Lisp," Apr. 2005. Apress. Chapter 5 Functions, Section "Keyword Parameters", pp. 56-57.

Abrahams, David, and Daniel Wallin. "The Boost Parameter Library." Jul. 18, 2005. Distributed under the Boost Software License. First included in Boost Libraries Version 1.33.0.

Kernighan, Brian W. and Dennis M. Ritchie. "The C Programming Language." 1988. Bell Telephone Laboratories, Inc. Second Edition. pp. 118-121, 146-147, 200-203, and 234-239.

U.S. Appl. No. 11/215,135, Apr. 3, 2009, Office Action.
U.S. Appl. No. 11/215,135, Nov. 12, 2009, Office Action.
U.S. Appl. No. 11/214,701, Jun. 11, 2009, Office Action.
U.S. Appl. No. 11/214,701, Jan. 11, 2010, Notice of Allowance.
U.S. Appl. No. 11/215,135, Apr. 14, 2010, Office Action.
U.S. Appl. No. 11/215,135, Oct. 4, 2010, Office Action.
U.S. Appl. No. 11/215,135, Feb. 28, 2011, Office Action.
U.S. Appl. No. 11/215,135, Aug. 16, 2011, Office Action.

* cited by examiner

```
Function F_exact (X AS B) AS B
    Return F ((ctype (X, A)), B)
    Ctype
    End Function
```

```
Function G_exact (X AS B) AS B
    Return G ((Ctype (X, C)), B)
    Ctype
End Function
```

```
Class C
Dim P As Object
Function H_exact (X AS B) AS B
Return P.H (X)
End Function
End Class
```

Fig. 7

```
Class Stub
IC As C
Function G_exact (X As B) As B
Return C.G (IC, X)
End Function
```

New D(IC, Address of CG)      ⟵ 800

⟶ Address of New Stub(IC). G_exact

Fig. 8

```
Delegate Function E(Me As C, X As B) As B
Function F(X As B)                                    910
  Dim (K₄ As E) = New E (Nothing, Address of IC.F)
              = Address of New Stub 2. E_exact Class Stub 2
  Function E_exact (Me As C, X As B) As B
                Me. F(X)
                End Function
```

RELAXED AND EXTENDED DELEGATES

CROSS-REFERENCE TO RELATED APPLICATIONS

The present application is a continuation of U.S. application Ser. No. 11/214,701, filed on Aug. 30, 2005 entitled "RELAXED AND EXTENDED DELEGATES," and is related to co-pending U.S. application Ser. No. 11/215,135, filed Aug. 30, 2005, and entitled, "IDENTIFIER EXPRESSIONS." The entirety of the above-noted applications are incorporated herein by reference.

BACKGROUND OF THE INVENTION

Programming languages continue to evolve to facilitate specification by programmers as well as efficient execution. In the early days of computer languages, low-level machine code was prevalent. With machine code, a computer program or instructions comprising a computer program were written with machine languages or assembly languages and executed by the hardware (e.g., microprocessor). These languages provided an efficient means to control computing hardware, but were very difficult for programmers to comprehend and develop sophisticated logic. Subsequently, languages were introduced that provided various layers of abstraction. Accordingly, programmers could write programs at a higher level with a higher-level source language, which could then be converted via a compiler or interpreter to the lower level machine language understood by the hardware. Further advances in programming have provided additional layers of abstraction to allow more advanced programming logic to be specified much quicker then ever before. However, these advances do not come without a processing cost.

Compilers and/or interpreters bear the burden of translating high-level logic into executable machine code. In general, a compilers and/or interpreters are components that receive a program specified in a source programming language (e.g., C, C#, Visual Basic, Java . . . ) and convert the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software programs.

Artificial restrictions may exist in various programming languages due to requirements of the Common Language Runtime (CLR) environments for example. Consider the following code in Visual Basic that defines the types A, B, C.

Class A . . .
Class B: Inherits A . . .
Class C: Inherits B . . .

Such can define a class hierarchy, wherein any instance of C may be legally substituted wherever an instance of B or A would be expected, and also any instance of B may be legally substituted wherever an instance of A would be expected. This substitutability defines "subtype", wherein class B is a subtype of class A, and that class C is a subtype of both class B and class A, or, symbolically, C<: B<: A. Put differently, "every B is an A, and every C is a B and an A"—(Technically, distinctions exist between "subclass" and "subtype," yet such differences are typically not germane for purposes of the subject innovation.)

The following substitution are considered in context of the following exemplary functions, and it is to be appreciated that other sub statements or procedures can also be implemented Function F(X As A) As C . . . REM F has type A→C
Function G(X As C) As A . . . REM G has type C→A
Function H(X As B) As B . . . REM H has type B→B Designating B1 and B2 as two instances of type B, and considering the following assignment statements, which have typed variables on their left-hand sides and function calls on their right-hand sides:

B2=F(B1)

Since B1 is an A and F expects an A in its input position, the input is type-safe, as it follows the substitutability criterion above. Since F(B1) is of type C, and every C is a B, the assignment of F(B1) to B2 is also type-safe. Such requires no special treatment, since the type conversions of both the argument and return value are so-called "upcasts," in the normal direction implied by the "is-a" relationship. Such type manipulation can be summarized as follows:

| F:: A → C B1 :: B B <: A | REM if F has type A → C, b1 has type B, and REM B is a subtype of A, then |
|---|---|
| F(B1):: C | REM the call F(b1) has type C |

The rule for assignments looks/checks that the type of the rhs is substitutable for the type of the lhs:

| F(B1) :: C B2 B C <: B | REM if rhs of the assignment has type C and REM C is a subtype of B, then |
|---|---|
| B2 = F(B1) is valid | REM it can be assigned to the lhs B2 :: B |

Likewise, considering the following case of:
B2=G(B1)

Since G expects a C in its argument position, a B cannot be freely passed. While every C is a B, it is not the case that every B is a C. As such, the user or the compiler must typically insert an explicit "downcast" type conversion on the argument B1 implying a run-time check of its dynamic type. Similarly, the instance of type A returned by G must be downcast to type B to complete the assignment. So, either the user or the compiler must typically rewrite the statement as follows:
B2=Ctype (G (Ctype (B1, C)), B)

Moreover, the call of H creates no difficulty, since both input and return types match exactly. It is trivially type-safe:
B2=H (B1)

In general, the current CLR and .NET programming languages only permit the H-form for delegates, in other words, the types must match exactly when calling a function through a delegate. Such can create an inconsistent and counter intuitive programming restriction that hinders flexibility of programming.

Therefore, there is a need to overcome the aforementioned exemplary deficiencies associated with conventional systems and devices.

SUMMARY OF EXAMPLE EMBODIMENTS

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that enhance expressibility in a programming language (e.g., Visual Basic) via relaxation of artificial restrictions and extension of delegates associated therewith, without changing the runtime infrastructure. A stub is employed that can replace an impermissible expression in the programming language, to leverage the existing permissible expressions. Such stub can convert a currently impermissible delegate construction to a currently allowed delegate construction. Accordingly, the stub can provide an exact type match such that if a form is acceptable for functions, a parallel form becomes acceptable for delegates. Moreover, a check for a requirement of exact match can be moved from a delegate creation to a function invocation. Thus, for example a restriction in visual basic that requires creation of a delegate upon existence of an exact match can be relaxed.

As such, the programming language can be manipulated via insertion of the stub to convert a currently impermissible delegate call into a currently allowed function call. In a related aspect, similar stubs and call re-writing can be employed to enable delegate creation on late-bound method groups.

In accordance with a further aspect of the subject innovation, optimizations can be introduced to remove conversions that are implemented for supplying an exact match. For example, a two stage optimization methodology can be employed, wherein in a first stage the VB compiler can supply an explicit conversion, and in a second stage if such conversion is unnecessary (e.g., in case of an up-cast no additional operation is required), it can be removed.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 7 illustrates an exemplary class definition written by the VB compiler for a late binding for generating an exact match in accordance with an aspect of the subject innovation.

FIG. 8 illustrates a syntax related to a case of passing an instance as an argument, and defining an instance delegate.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component,", "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "computer program" as used herein is intended to encompass a computer program accessible from any computer readable device, carrier, or media. For example, computer readable media can include storage media that includes but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated communication media such as a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
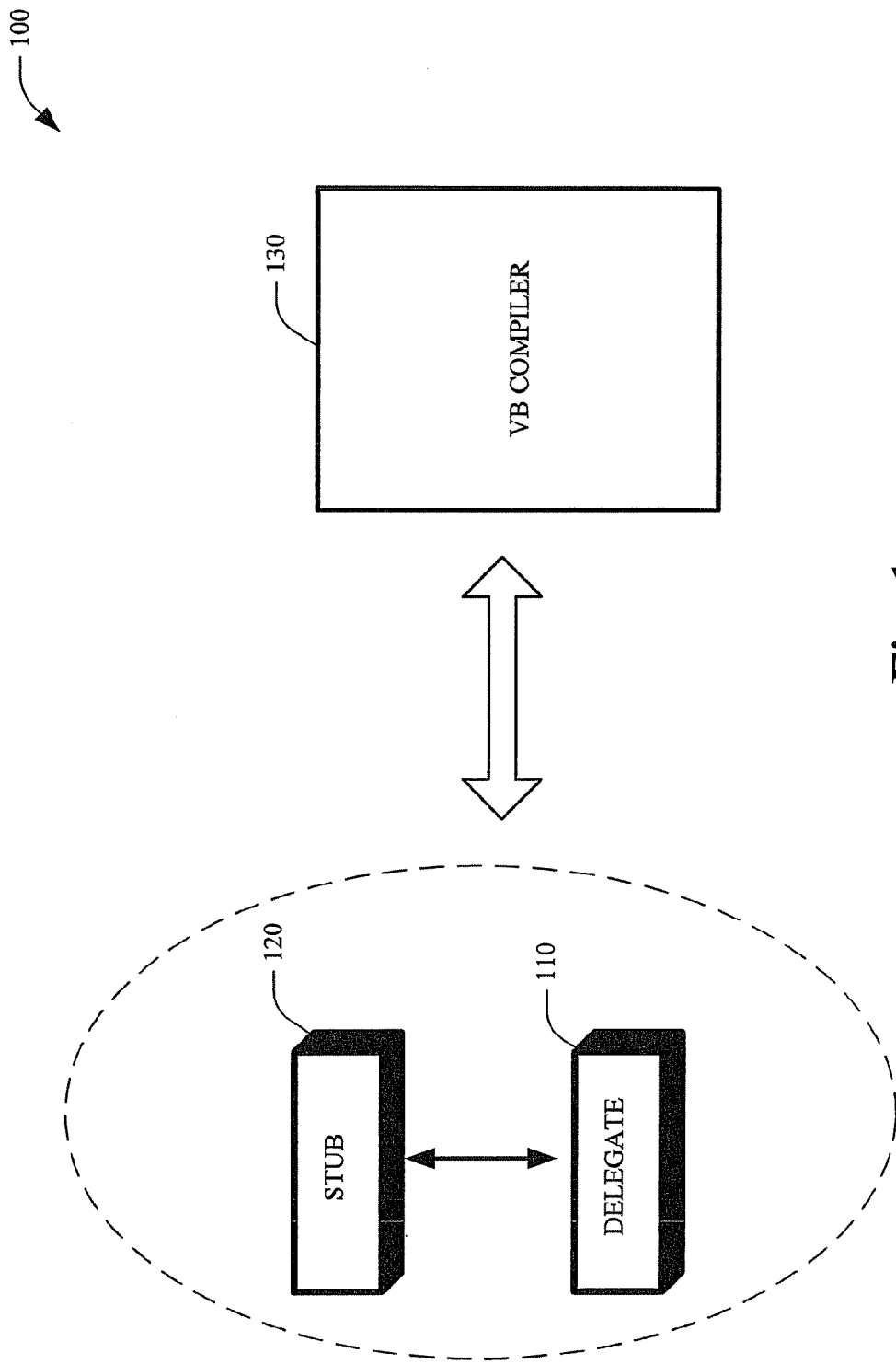
FIG. 1 is a block diagram of an execution system for relaxed and extended delegates.

Turning initially to FIG. 1, an execution system 100 is illustrated for execution of relaxed and extended delegates of the subject innovation. A stub 120 is employed that can replace an impermissible expression in the programming language, to leverage the existing permissible expressions, as described in detail infra. Such can enhance expressibility in a programming language (e.g., Visual Basic) via relaxation of artificial restrictions and extension of delegates associated therewith, without changing the runtime infrastructure. Typically, a Common Language Runtime is an execution environment with a rich object-oriented class library through which software components written in diverse languages can interoperate.

In general the execution environment can organize classes into an inheritance hierarchy. Moreover, a subtype relation from the inheritance hierarchy can be introduced wherein, wherein an item of type A may be used in a context expecting an item of type B.

As illustrated in FIG. 1 and in the context of Visual Basic, delegates 110 are objects employed to call methods of other objects. Such delegates can also be described as type-safe function pointers as they are similar to function pointers used in other programming languages. Unlike function pointers Visual Basic .Net delegates can be called without a specific instance of a class and instance methods.

For example, delegates 110 can be useful in situations where an intermediary is required between a calling procedure and the procedure being called. A delegate statement can be used to declare a delegate. As such, delegates 110 can be considered as reference type that refers to a shared method of a type or to an instance method of an object. In general, the delegate statement defines the parameter types and return type of a delegate class. Moreover, any procedure with matching parameter types and return type may be used to create an instance of this delegate class. The procedure can then later be invoked via the delegate instance, by calling the delegate's Invoke method.

The stub 120 can convert a currently impermissible delegate construction to a currently allowed delegate construction. Accordingly, the stub 120 can provide an exact match such that if a form is acceptable for functions, a parallel form becomes acceptable for delegates 110. Thus, for example a restriction in visual basic that requires creation of a delegate upon existence of an exact match can be relaxed.

As such, the programming language can be manipulated via insertion of the stub to convert a currently impermissible delegate call into a currently allowed function call.

The VB compiler 130 can accept as input a file having source code associated with processing of a sequence of elements. The source code may include various expressions and associated functions, methods and/or other programmatic constructs. The VB compiler 130 may process source code in conjunction with one or more components for analyzing constructs and generating or injecting code.

A development component (not shown) can supply the source code to the VB compiler 130, to generate computer executable program or alternatively some intermediate format (e.g., IL (intermediate language)) that can be further compiled at runtime, for example by a just-in-time (JIT) compiler. The VB compiler 130 could also be a part of an Integrated Development Environment (IDE).

Figure 2:
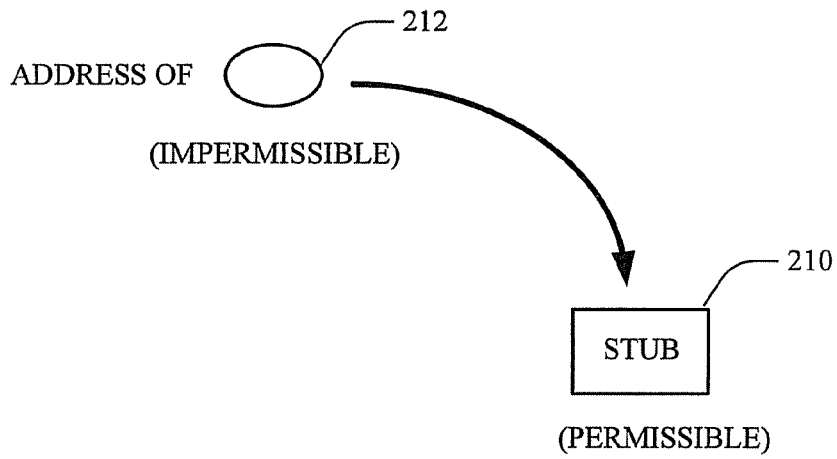
FIG. 2 illustrates an exemplary stub arrangement according to the subject innovation.

Referring now to FIG. 2, each delegate class can define a constructor that is passed the specification of an object method. An argument to a delegate constructor must typically be an expression of the form:

Addressof [<expression>.]<methodname>

Employing the stub 210, enables relaxation of artificial restrictions and extension of delegates associated with the VB programming language. The stub 210 can replace an impermissible expression in the programming language, to leverage the existing permissible expressions. Accordingly, the stub 210 can provide an exact match such that if a form is acceptable for functions, a parallel form becomes acceptable for delegates. Thus, for example a restriction in visual basic that requires creation of a delegate upon existence of an exact match can be relaxed.

Additional optimizations can also be introduced, for example, considering

B2=Ctype (F (Ctype (B1, A)), B)

F is called with a C type of B1 and F expects an A, and a C type is performed for a result. B1 is being converted to an A, nonetheless it is already known that B is an A, and likewise F returns a C and is being converted to a B. As such, conversion on the result is not performing any additional act, because such is already the case. Conceptually, if no exact match exists the VB compiler performs such actions in a first step, and if such conversions do not perform anything, they can be removed, as described in detail infra.

Figure 3:
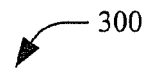
FIG. 3 illustrates an exemplary expression in conjunction with relaxed and extended delegates.

FIG. 3 illustrates an expression wherein for a scenario that is not an exact match; B is taken to return a B, and F takes an A and returns a C. As such, the function performs an exact match, where a B is taken and a B is returned. Accordingly, instead of "Address of F", "Address of Fexact" can be employed.

Dim $D_F$ AS DAddress of $F_{exact}$.

In the above example, the stub employed to create an exact match is in the form of:

Function $F_{exact}$. (X As B) As B

Figures 4, 5:
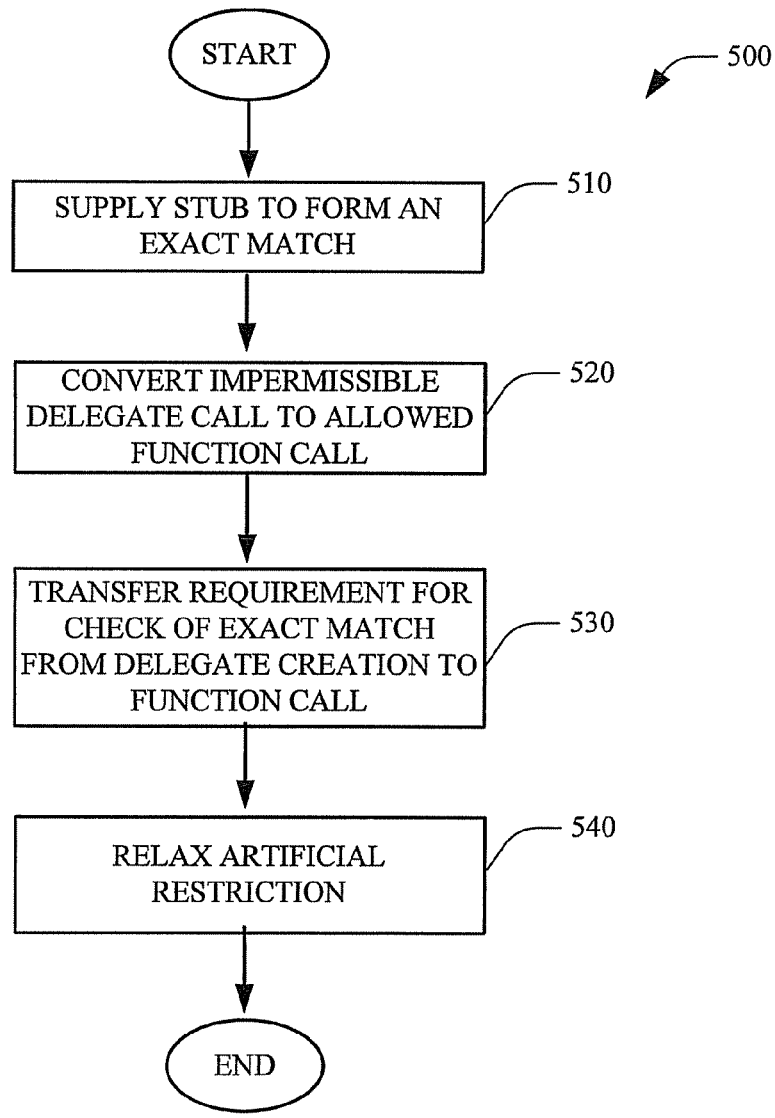
FIG. 4 illustrates another expression for an exemplary function.
FIG. 5 illustrates a methodology in accordance with an aspect of the subject invention.

The VB compiler is already capable of calling F using a B and returning a B. Likewise FIG. 4 illustrates a similar expression for a Function G, wherein X as B returns a B, and returns G of C type of C, (similar to what VB would have done in a call.) Accordingly, a conversion is placed and functions defined when an exact match does not exist.

Referring now to FIG. 5, a methodology in accordance with an aspect of the subject invention is illustrated. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 510, a stub can be supplied to form an exact match. Subsequently and at 520 the supplied stub can convert an impermissible delegate call to an allowed function call. As such, a requirement for check of exact match can be transferred from delegate creation to function call, and artificial restrictions described in detail supra can be relaxed at 540.

Figure 6:
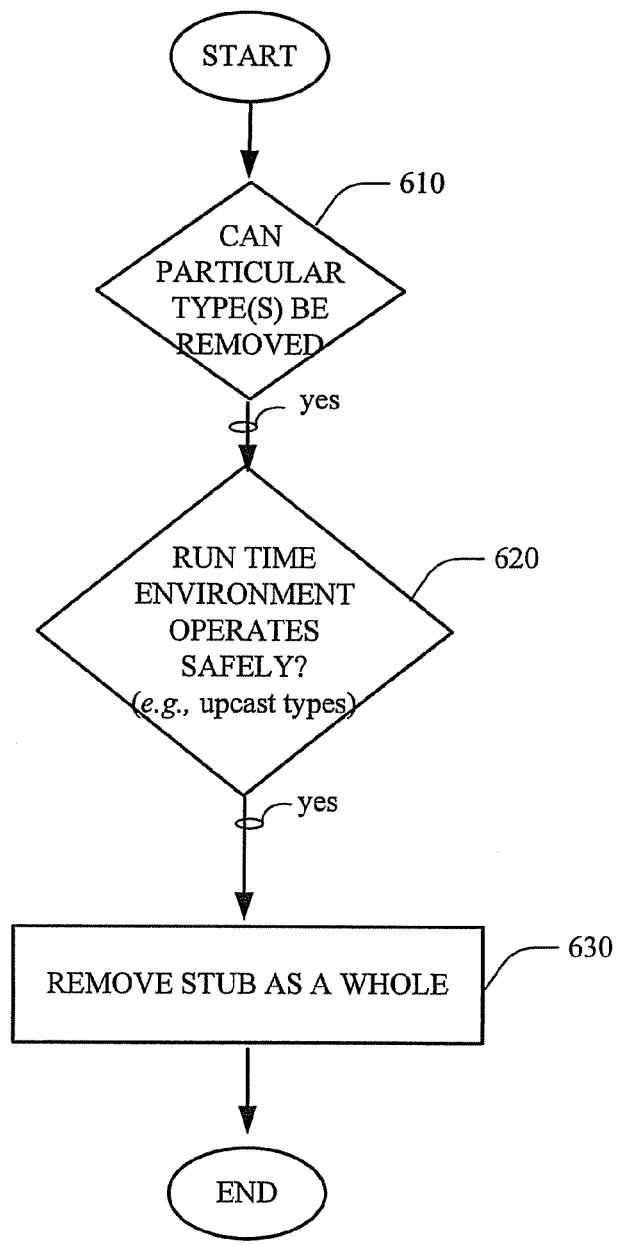
FIG. 6 illustrates a methodology of optimization in accordance with an aspect of the subject innovation.

FIG. 6 illustrates a methodology of optimization in accordance with an aspect of the subject innovation. Typically, the following expression does not perform any additional act, as the types are upcast.

Function $F_{exact}$. (X As B) As B
Return F(X)
End Function

The optimization can be performed in two stages, for example. In the first stage, it can be determined whether the language itself is not performing and a particular type (e.g., a C type) can be removed. In the second stage, a determination can be made regarding the performance of the Common Language Runtime (CLR), and the whole stub can be removed. As illustrated at 610, a determination is made as to removal of a type. If so, at 620 a determination can be made as to the performance of the .NET environment, e.g. creation of a delegate is safe if upcast types are employed. Subsequently and at 630 the stub can be removed as a whole.

FIG. 7 illustrates a class definition written by the VB compiler for a late binding in conjunction with the following example for generating an exact match in accordance with an aspect of the subject innovation.

For example if Dim P exists as an object
Class P
Function M(X As B) As B
Dim P as Object=New P( )
Dim $D_x$ As D
=Address of P.H Such can return an error message by the VB compiler as P.H is not an exact match, and P is an object. As such, the class of FIG. 7 can be defined as Class C, and
Address of New C(P). $H_{exact}$ Accordingly, similar to the case of an instant delegate, the function can be defined with the signature required by the delegate. The call can be initiated with the correct arguments and the delegates created accordingly.

FIG. 8 illustrates a new syntax 800 related to a case of passing an instance as an argument, and defining an instance delegate. For example, a delegate function can take a B and return a B, such as:
Delegate Function D(X As B) As B A class can be defined with three methods, including an instance method, wherein inside the body of the method a reference to "Me" can be provided as noted below:
Class C
=Function F(X As B) As B Me As C
Shared Function H (X As B)
Shared
=Address of P.H
Delegates can be supplied as follows:
Dim K As D=Address of C.H
Dim C As C=New C( )
Dim $K_2$ As D=Address Of Cl.F
  Can also be written as //New C( ).F
  Also conceptually
F(X As B) As Me As C
Such can take F(Me As C, X As B) As B
  F(Me As C, X As B) As B
  A delegate can be defined (and passed as an instance), wherein by employing a shared method:
Dim $K_3$ As D=New D (IC, Address of CG)

Such permits creating a delegate from a static method that has an instance variable.
Dim $K_3$ As D=New D (IC, Address of CG)
The delegate can be created from Static Shared Function M (X as B) As B of CG wherein the class stub, and new syntax is illustrated in FIG. 8. It is to be appreciated that if the CLR supports direct implementation for the static method, then requirement for creating the stub can be mitigated.

Figures 9, 10:
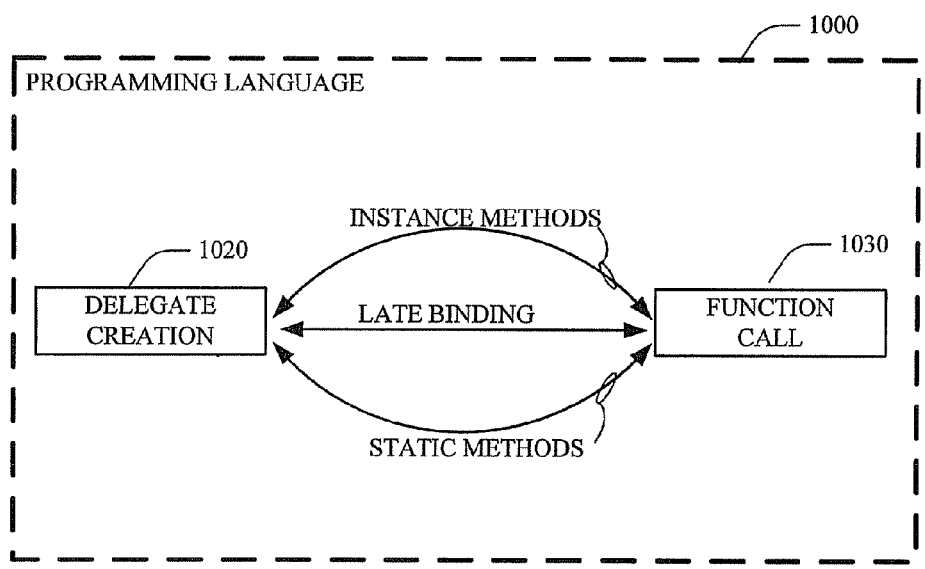
FIG. 9 illustrates a syntax related to an instance being captured as though it was a static method.
FIG. 10 illustrates a block diagram for a programming environment wherein a check for a requirement of exact match can be moved from a delegate creation to a function call.

FIG. 9 illustrates a similar scenario where an instance is captured as though it was a static method. Since a call can be made, the subject innovation can provide for a delegate function, via employing the 910 expression. Accordingly, a delegate can be created with a type that does not match by employing a stub, which supplies for an exact match.

The following provides an additional example for the extended and relaxed delegates of the subject innovation. A declaration can include:
Delegate Function Dts (Xt As T, . . . ) As S
REM defines the type Ds= . . . T . . . →S
Such defines the type Dts as that of delegates to functions that take arguments of type T, amongst others, and return results of type S.

Moreover, the member declaration of
Function Fts ( . . . , Yt As T, . . . ) As S
REM Fts has type . . . T . . . →S
can define a particular function Fts, which takes arguments of type T, amongst others, and returns results of type S. As explained earlier, VB and the CLR support creating a delegate to Fts as follows:
Dts Dfts=New Dts (AddressOf Fts)
REM same type, . . . T . . . →S, both sides
(because the types in the argument list and the return types match exactly.)

Also, considering:
Function Fab (Xa As A, . . . ) As B
REM Fab has type . . . A . . . →B
which defines a particular function Fab that takes arguments of type A, amongst others, and returns results of type B. As explained earlier in the inheritance relationship, the statement Zs=Fab (Xt) REM . . . A . . . →B applied to T assigned to S is type-safe if T<: A and B<: S, so consequently, it is desired that the corresponding delegate creation Dts Dfab=new Dts (AddressOf Fab) to be also legal.

Typically, a direct and general way to achieve such result is to inject the following into the source

---

Function FtsStub ( ..., Qt as T, ... )   As S REM has type T → S
                                         REM exactly the type required
Dim Xa As A = Qt    REM type-safe because T <: A
    ...             REM treat other arguments likewise
Dim Rb As B = Fab ( ..., Xa, ... ) REM exact type matches
Dim Rs = Rb         REM type-safe because B <: S
Return Rs           REM exact type match
End Function

--- and replace the instantiation of the delegate
Dts Dfab=new Dts (AddressOf Fab) REM what is desired but impermissible
with Dts Dfab=new Dts (AddressOf FtsStub)
REM acts the same The exemplary pattern above can be referred to as "relaxed delegates". In general the pattern amounts to the following rule, wherein given the delegate and function declaration;
Delegate Function D( . . . , X As T, . . . ) As S
Function F( . . . , X As A, . . . ) As B
and the following variable declarations,
Dim X As T
Dim Y As S
Dim DF As D
then whenever the method call Y=F( . . . , X, . . . ) is valid the corresponding delegate creation expression DF=New D(AddressOf F) should also be valid.

Referring now to 10, a block diagram for a programming environment is illustrated wherein a check for a requirement of exact match can be moved from a delegate creation 1020 to a function call 1030. Thus, for example a restriction that requires creation of a delegate upon existence of an exact match can be relaxed (e.g., in visual basic.) As explained in detail supra, a stub can be employed for managing delegates in instance methods, static methods and late-bound calls to delegates. Moreover, such stub can also manage delegate construction employing handles clause. The stub can replace an impermissible expression in the programming language 1000, to leverage the existing permissible expressions. Such stub can convert a currently impermissible delegate call to a currently allowed function call. Accordingly, the stub can provide an exact type match such that if a form is acceptable for functions, a parallel form becomes acceptable for delegates.

Figure 11:
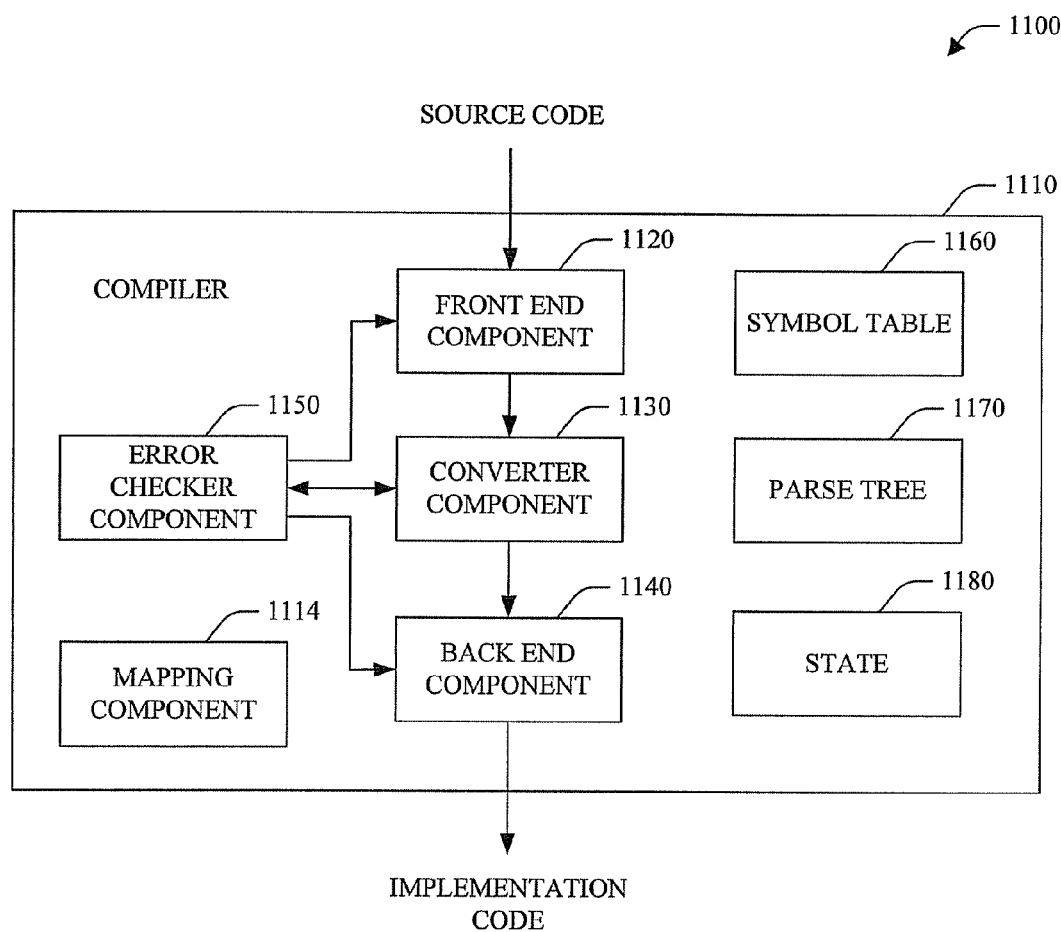
FIG. 11 is a block diagram depicting a compiler environment that can be employed to produce implementation code in accordance with an aspect of the subject innovation.

FIG. 11 is a block diagram depicting a compiler environment 1100 that can be utilized to produce implementation code (e.g., executable, intermediate language . . . ). The compiler environment 1100 includes a compiler 1110 including a mapping component 1114 as described above, a front-end component 1120, a converter component 1130, a back-end component 1140, an error checker component 1150, a symbol table 1160, a parse tree 1170, and state 1180. The compiler 1110 accepts source code as input and produces implementation code as output. The input can include but is not limited to delimited programmatic expressions or qualified identifier as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 1110 can accept as input a file having source code associated with processing of a sequence of elements. The source code may include various expressions and associated functions, methods and/or other programmatic constructs. The compiler 1110 may process source code in conjunction with one or more components for analyzing constructs and generating or injecting code.

A front-end component 1120 reads and performs lexical analysis upon the source code. In essence, the front-end component 1120 reads and translates a sequence of characters (e.g., alphanumeric) in the source code into syntactic elements or tokens, indicating constants, identifiers, operator symbols, keywords, and punctuation among other things.

The converter component 1130 parses the tokens into an intermediate representation. For instance, the converter component 1130 can check syntax and group tokens into expressions or other syntactic structures, which in turn coalesce into statement trees. Conceptually, these trees form a parse tree 1170. Furthermore and as appropriate, the converter module 1130 can place entries into a symbol table 1130 that lists symbol names and type information used in the source code along with related characteristics.

A state 1180 can be employed to track the progress of the compiler 1110 in processing the received or retrieved source code and forming the parse tree 1170. For example, different state values indicate that the compiler 1110 is at the start of a class definition or functions, has just declared a class member, or has completed an expression. As the compiler progresses, it continually updates the state 1180. The compiler 1110 may partially or fully expose the state 1180 to an outside entity, which can then provide input to the compiler 1110.

Based upon constructs or other signals in the source code (or if the opportunity is otherwise recognized), the converter component 1130 or another component can inject code corresponding to facilitate efficient and proper execution. Rules coded into the converter component 1130 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1160 and the parse tree 1170, a back-end component 1140 can translate the intermediate representation into output code. The back-end component 1140 converts the intermediate representation into instructions executable in or by a target processor, into memory allocations for variables, and so forth. The output code can be executable by a real processor, but output code that is executable by a virtual processor can also be provided.

Furthermore, the front-end component 1120 and the back end component 1140 can perform additional functions, such as code optimization, and can perform the described operations as a single phase or in multiple phases. Various other aspects of the components of compiler 1110 are conventional in nature and can be substituted with components performing equivalent functions. Additionally, at various stages during processing of the source code, an error checker component 1150 can check for errors such as errors in lexical structure, syntax errors, and even semantic errors. Upon detection error, checker component 1150 can halt compilation and generate a message indicative of the error.

Figure 12:
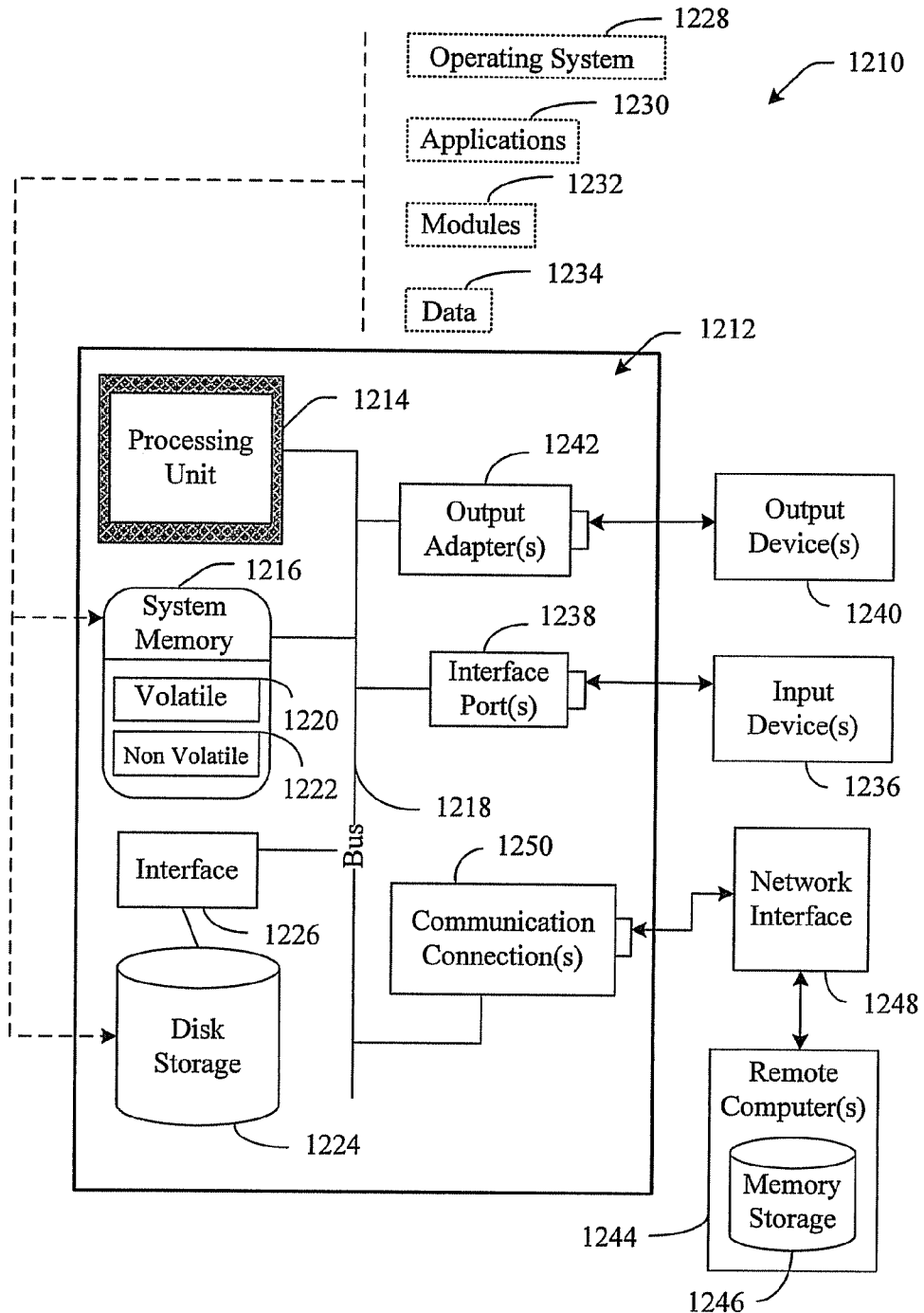
FIG. 12 illustrates an exemplary environment for implementing various aspects of the subject innovation.
Figure 13:
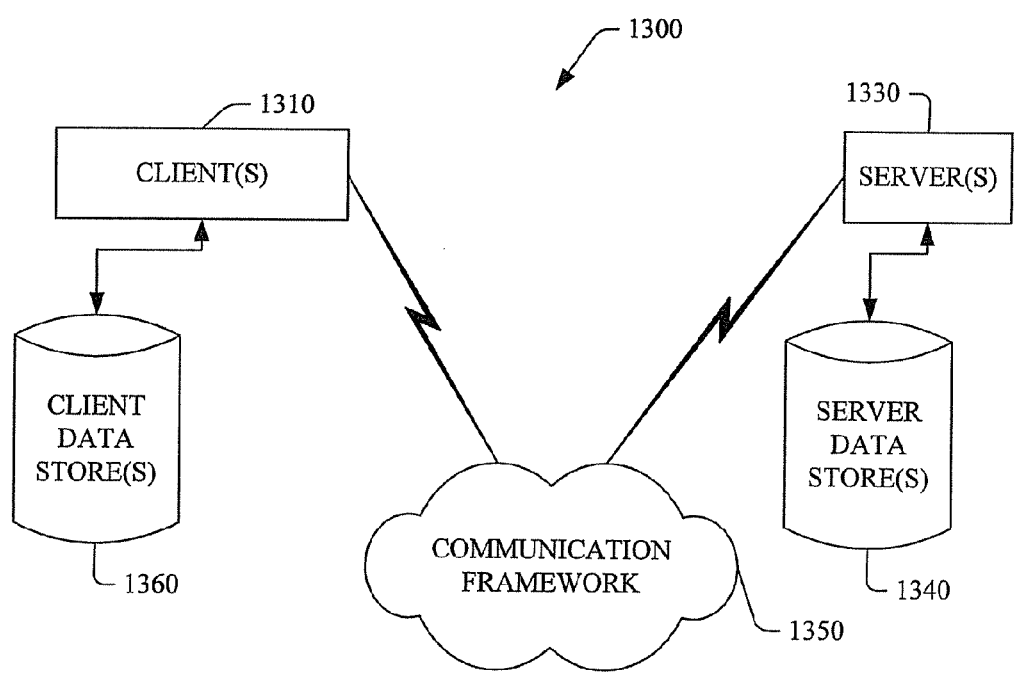
FIG. 13 is a schematic block diagram of a sample computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects described herein includes a computer 1212. The computer 1212 includes a processing unit 1214, a system memory 1216, and a system bus 1218.

The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1236 take advantage of the management of resources by operating system 1228 through program modules 1232 and program data 1234 stored either in system memory 1216 or on disk storage 1224. It is to be appreciated that various components described herein can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240, like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 that can be employed in conjunction with the subject innovation. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the components described herein, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s)

1310. Similarly, the server(s) 1330 are operably connected to one or more server data store(s) 1340 that can be employed to store information local to the servers 1330.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional words in a claim.

What is claimed is:

1. A method for relaxing artificial restrictions associated with a programming language and extend delegates associated with such programming language, without changing a runtime structure associated therewith, comprising:
    accessing source code written in a programming language;
    processing the source code written in the programming language, wherein processing includes:
        identifying an impermissible expression in the source code, the impermissible expression improperly defining a delegate construction according to the programming language, such that the impermissible expression is not type-safe;
        inserting a stub in place of the impermissible expression defining an improper delegate construction, wherein the stub provides a proper exact match in the programming language, the exact match being type-safe; and
        defining a constructor by a delegate class passed a specification of an object method to make the stub convert a currently impermissible expression to a currently permissible delegate construction; and
    moving a requirement that a check for an exact match be performed at delegate creation, such that a check for an exact match is instead made at a function call.

2. The method of claim 1, wherein the stub has a form of: Function Y (X As Z) As Z.

3. The method of claim 1, wherein the source code is accessed by a .NET environment, and wherein the impermissible expression is not type safe in a .NET programming language.

4. The method of claim 1, wherein the exact match provided by the stub provides an acceptable form within the programming language for delegate construction.

5. The method of claim 4, wherein the acceptable form within the programming language provided by the stub is permissible for function invocation.

6. The method of claim 1, further comprising:
    optimizing the source code, wherein optimizing the source code comprises removing conversions supplying an exact match.

7. The method of claim 6, wherein optimizing the code comprises an upcast operation.

8. The method of claim 1, wherein the stub manages delegate construction from static methods.

9. The method of claim 1, further comprising:
    inserting one or more stubs and re-writing calls enabling delegate creation on late-bound method groups.

10. The method of claim 1, wherein accessing the source code is performed within a computing environment that includes a Visual Basic (VB) compiler.

11. One or more computer-readable storage device having stored thereon computer-executable instructions that, when executed by a processor, cause a computing system to perform the following:
    access source code written in a programming language;
    process the source code, wherein processing the source code includes:
        identifying an impermissible expression in the source code, the impermissible expression improperly defining a delegate construction according to the programming language;
        inserting a stub in place of the impermissible expression defining an improper delegate construction, wherein the stub provides a proper exact match in the programming language; and
        defining a constructor by a delegate class passed a specification of an object method to make the stub convert a currently impermissible expression to a currently permissible delegate construction; and
    moving a requirement that a check for an exact match be performed at delegate creation, such that the a check for an exact match is instead performed at a function call.

12. The one or more computer-readable storage device of claim 11, wherein the computer-executable instructions further cause the computing system to:
    create a delegate from a shared function.

13. The one or more computer-readable storage device of claim 11, wherein the exact match provided by the stub provides an acceptable form within the programming language for delegate construction.

14. The one or more computer-readable storage device of claim 13, wherein the acceptable form within the programming language provided by the stub, is permissible for function invocation.

15. The one or more computer-readable storage device of claim 11, wherein the programming language only permits delegates to have an H-form.

16. The one or more computer-readable storage device of claim 11, wherein the computer-executable instructions further cause the computing system to:
    optimize the source code, wherein optimizing the source code comprises removing conversions supplying an exact match.

17. The one or more computer-readable storage device of claim 11, wherein the stub manages delegate construction from static methods.

18. The one or more computer-readable storage device of claim 11, wherein the computer-executable instructions further cause the computing system to:
    insert one or more stubs and re-write calls enabling delegate creation on late-bound method groups.

19. The one or more computer-readable storage device of claim 11, wherein the source code is accessed by a .NET environment, wherein the programming language is Visual Basic (VB), and wherein the .NET environment includes a VB compiler.

20. A computing system comprising:
    a processor;
    one or more computer-readable storage device communicatively coupled to the processor, the one or more computer-readable storage device having thereon computer-executable instructions that, when executed by the processor, cause the computing system to:
        access source code written in a programming language, wherein such access is performed by a computing environment that includes a compiler;

use the computing environment to process the source code, wherein processing the source code includes:

identifying an impermissible expression in the source code, the impermissible expression improperly defining a delegate construction according to the programming language;

inserting a stub in place of the impermissible expression defining an improper delegate construction, wherein the stub provides a proper exact match in the programming language, wherein the stub defines an exact match for a function such that when the exact match is acceptable for functions it is also acceptable for delegates, and wherein the stub has a form of: Function Y (X as Z) As Z; and defining a constructor by a delegate class passed a specification of an object method to make the stub convert a currently impermissible expression to a currently permissible delegate construction; and moving a requirement of the computing environment that a check for an exact match be performed at delegate creation, such that the computing environment instead checks for an exact match at a function call.

21. The computing system recited in claim 20, wherein the computing system comprises a computer.

* * * * *